United States Patent [19]

Tribolet et al.

[11] 4,417,258

[45] Nov. 22, 1983

[54] BI-DIRECTIONAL PEN CHANGER

[75] Inventors: David C. Tribolet, San Diego; Richard M. Kemplin, Poway, both of Calif.

[73] Assignee: Hewlett-Packard Company, Palo Alto, Calif.

[21] Appl. No.: 339,212

[22] Filed: Jan. 13, 1982

[51] Int. Cl.³ .............................................. G01D 15/00

[52] U.S. Cl. .................................. 346/139 R; 346/29; 400/171

[58] Field of Search ..................... 346/139 R, 140, 29, 346/46; 33/1 M, 18 R; 400/171

[56] References Cited

U.S. PATENT DOCUMENTS 4,135,245 1/1979 Kemplin ..................... 346/139 R X
4,281,938 8/1981 Phillips ................................ 400/171
4,288,798 9/1981 Hollmayer ...................... 346/139 R

FOREIGN PATENT DOCUMENTS 2913690 10/1979 Fed. Rep. of Germany .

*Primary Examiner*—Joseph W. Hartary
*Attorney, Agent, or Firm*—Joseph H. Smith

[57] ABSTRACT

A bi-directional pen changer for use in an X-Y plotter is disclosed which requires only a single axis of motion for pen snatch, pen re-insertion, and plotting. The device is made up of two pen stables, one on each side of a pen carriage, for holding pens when not in use, and a pen holder located between the two pen stables which holds a pen during plotting. The pen holder is mounted on the pen carriage and is a symmetric device configured to snatch and re-insert a pen from either side. The snatch and re-insertion of pens by the pen holder is accomplished by co-acting clamp arms on the pen holder and on each pen stable. The pen holder clamp arms are configured such that the pen tip is always at the same location relative to the clamp arms when the pen holder is holding a pen, regardless of the side from which the pen is snatched.

8 Claims, 14 Drawing Figures

BI-DIRECTIONAL PEN CHANGER

BACKGROUND OF THE INVENTION

In recent years, with the development of micro- and minicomputers, the expense of associated computer peripherals has often outweighed the expense of the CPU itself. This has been especially true with electronic drafting devices. As a result, there have been a number of efforts in this latter area to reduce costs, the particular philosphy being to reduce the number of electromechanical parts required and to rely on as many passive elements as possible. This philsophy has been particularly predominant in the development of pen-holding and pen-changing devices.

An example of these efforts is described in Offenlegungsschrift No. 29 13 690 published on Oct. 10, 1979, entitled PEN CHANGING DEVICE. This prior art device is shown in FIG. 1. It consists of a pen stable 1 where a pen 2 resides when not in use, and a pen holder 4 which holds pen 2 during plotting. Both pen stable 1 and pen holder 4 are equipped with two-sided flexible clamps 3 and 5, respectively, each having a barb-shaped widening at their free ends. When pen 2 is in its home position in pen stable 1, flexible clamp 3 partially surrounds the pen. However, by moving pen holder 4 close to pen stable 1, flexible clamp 5 moves flexible clamp 3 away from pen 2, permitting flexible clamp 5 to clasp pen 2 and snatch it from pen stable 1. Once the snatch has been completed, pen holder 4 is moved away from pen stable 3 and continues to hold pen 2 during plotting.

In the above design, a significant disadvantage is the use of two-sided flexible clamps. This permits side play of the pen 2 in pen holder 4 and reduces the accuracy of the lateral pen 2 in pen holder 4 and reduces the accuracy of the lateral position of the pen relative to the axis of pen motion, i.e., relative to the X-direction. Furthermore, with this design, the pen can only be snatched from one side of pen holder 4.

BRIEF SUMMARY OF THE INVENTION

According to a preferred embodiment of the invention, a bi-directional pen changer mechanism is disclosed which requires only a single axis of motion for pen snatch, reinsertion, and plotting. The device is made up of two pen stables, one on each side of a pen carriage for holding pens when not in use, and a pen holder located between the two pen stables which holds a pen during plotting. The pen holder is mounted on the pen carriage and is configured with two independent clamp arms, one for engaging each pen stable, making a symmetric device. Each clamp arm is equipped with a barb-shaped end for holding the pen in a well defined position. Each pen stable has a fixed body and a single clamp arm with a barb-shaped end for holding a pen firmly against the fixed body.

To snatch a pen from a pen stable, the empty pen holder is moved into contact with the stable causing the barbed-shaped end of the pen holder clamp arm to engage the barbed-shaped end of the pen stable clamp arm, pushing it aside and clasping the pen. The pen holder then is moved clear of the pen stable and standard plotting routines can be followed. Upon completion of the plotting routines, the pen holder re-inserts the pen in the pen stable by the reverse procedure. In this reverse procedure, however, the pen holder barbed-shaped end is moved aside by the barbed-shaped end of the pen stable clamp arm which then clasps the pen, and the pen holder is again moved clear of the pen stable. The symmetry of the pen holder makes it possible to snatch or re-insert a pen from either side. Also, the pen holder clamp arms are configured such that the pen tip is always at the same location relative to the clamp arms when the pen holder is holding a pen, regardless of the side from which the pen is snatched.

DETAILED DESCRIPTION OF THE INVENTION

Figures 1, 2, 3, 4, 5, 6, 7, 8, 9:
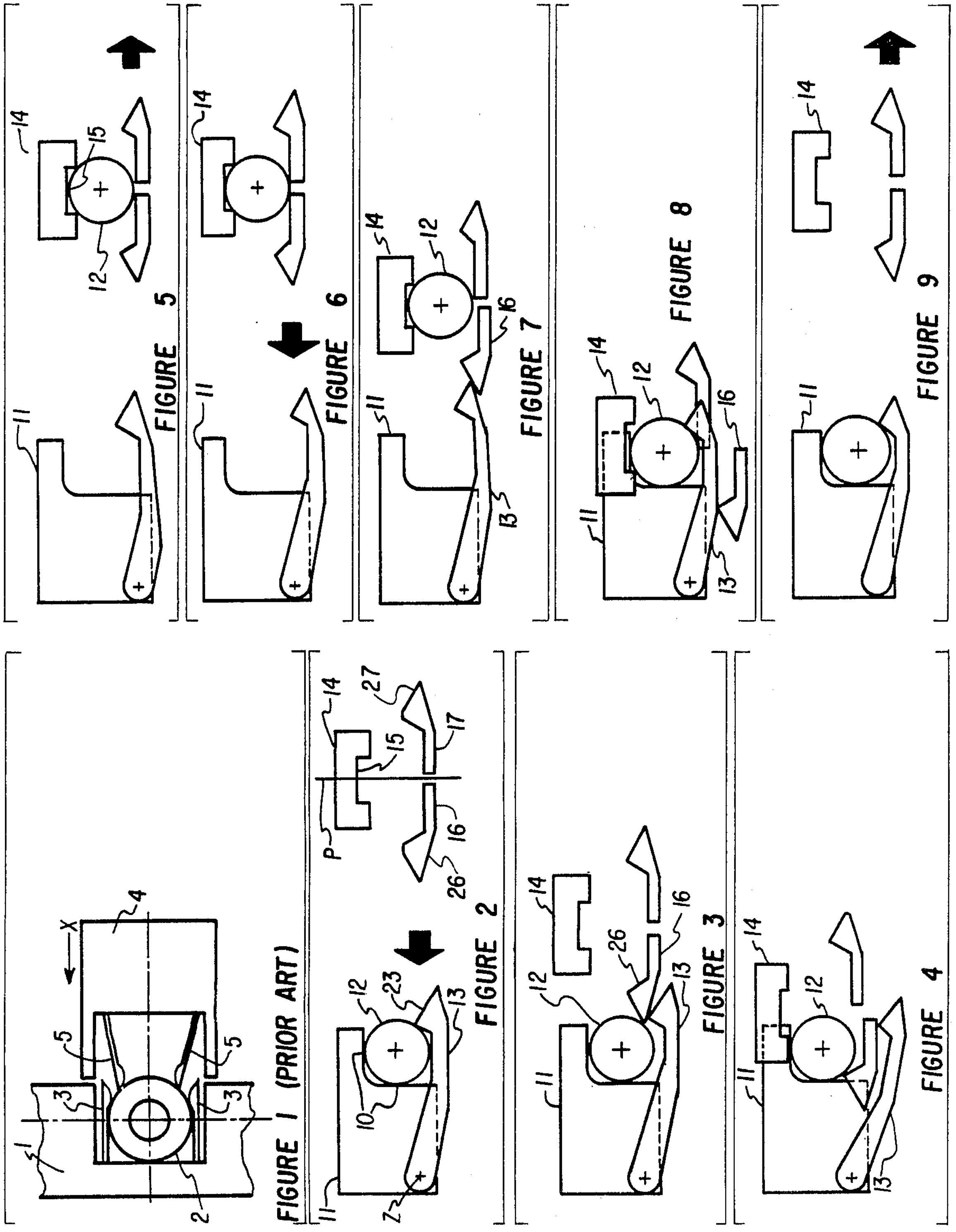
FIGURE 1 (PRIOR ART)
FIG. 1 is a diagram of a prior art pen changing device.
FIGS. 2 through 9 correspond to a horizontal cut through a portion of a preferred embodiment of the invention, as viewed from above, showing different stages of operation.

FIGS. 2 through 9 show a top view of a preferred embodiment of the invention in operation, from pen snatch through re-insertion. FIG. 2 shows a pen stable 11 having a concave portion 10 for cradling a pen 12 in a well defined position. Also shown is a single clamp arm 13 hinged about a vertical axis Z on pen stable 11, clamp arm 13 having a barb-shaped end 23. Clamp arm 13 is typically equipped with a rubber band or spring (not shown) for holding clamp arm 13 firmly in contact with pen 12, in order that pen 12 is held in place in a concave portion 10 of pen stable 11. Also shown in FIG. 2 is a pen holder 14 for snatching pen 12 from pen stable 11 and for holding pen 12 during plotting. Pen holder 14 is symmetrical in a plane P perpendicular to its direction of motion, and is equipped with two clamp arms 16 and 17 located opposite each other (i.e., on opposite sides of plane P) in order to snatch a pen from either side. Clamp arms 16 and 17 also have barb-shaped ends 26 and 27, respectively.

In FIGS. 3 and 4, pen holder 14 is moved toward pen stable 11, the barb-shaped end 26 of clamp arm 16 moving clamp arm 13 aside in order to snatch pen 12 from the stable. A rubber band or spring (not shown) is typically used to provide a restoring force on clamp arm 16 to maintain clamp arm 16 near its home position illustrated in FIG. 2. FIG. 5 shows the nominal position of pen 12 centered in a concave portion 15 of pen holder 14 after the snatch.

FIGS. 6 through 9 show the process of re-insertion of pen 12 into pen stable 11. In this process, pen holder 14 is again moved toward pen stable 11. Clamp arm 13 is configured to have a nominal position, when not holding a pen, such that clamp arm 13 moves inside clamp arm 16, forcing it to one side, as pen holder 14 closes with pen stable 11 (see FIG. 7). Then clamp arm 13 takes control of pen 12 (see FIG. 8) and pen holder 14 moves clear of pen stable 11 as shown in FIG. 9.

Figure 11:
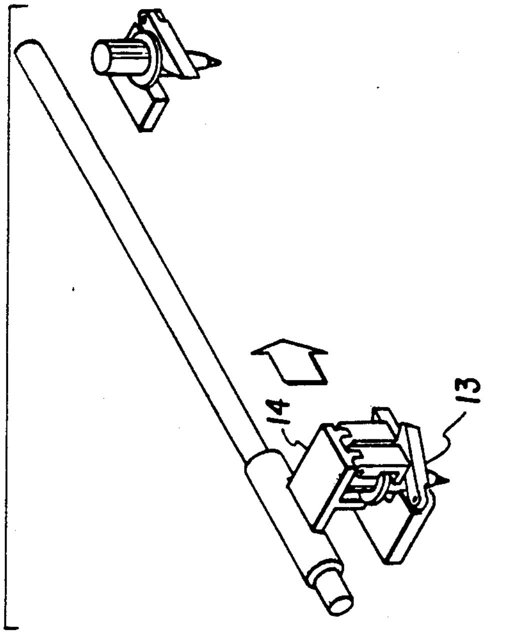
FIGS. 10 through 14 are an oblique view of a preferred embodiment of the invention showing the relationship between pen stables and pen holder.
Figure 10:
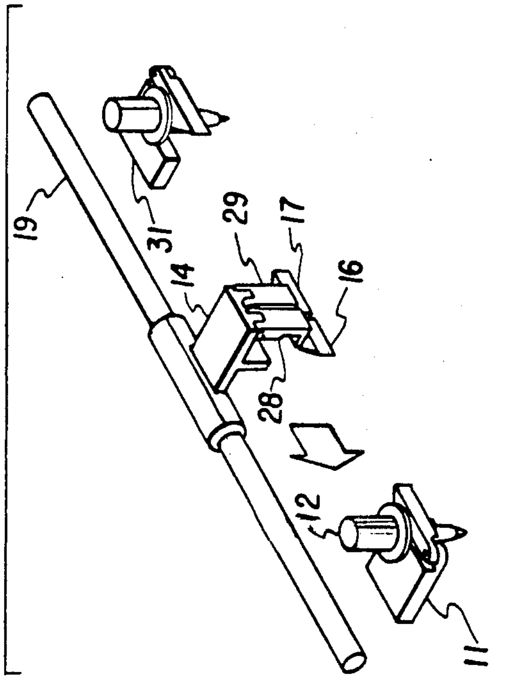

FIGS. 10 through 14 show an oblique view of this same process. In FIG. 10, pen holder 14 is shown mounted onto carriage bar 19 and is being moved toward pen stable 11 by a pen axis motor (not shown). Clamp arms 16 and 17 are hinged about a horizontal axis via extension arms 28 and 29, respectively. As illustrated in FIG. 11, clamp arm 13 is moved aside as pen holder 14 snatches the pen and moves away.

Figure 12:
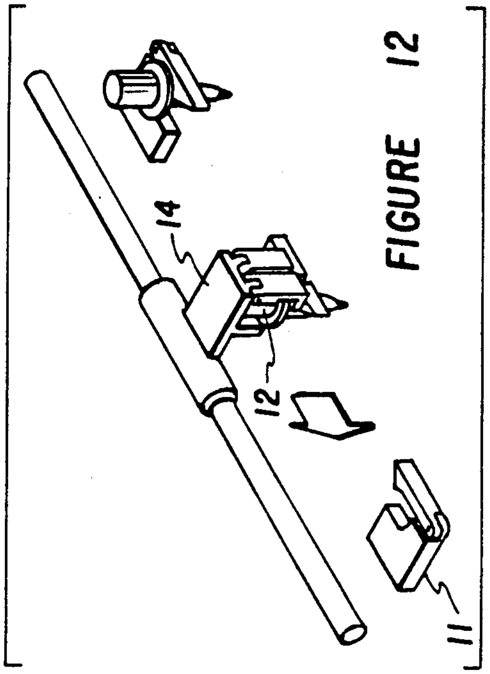
Figure 14:
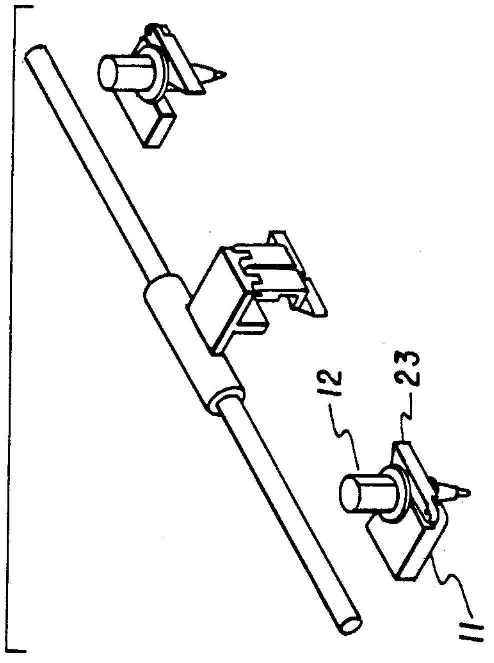
Figure 13:
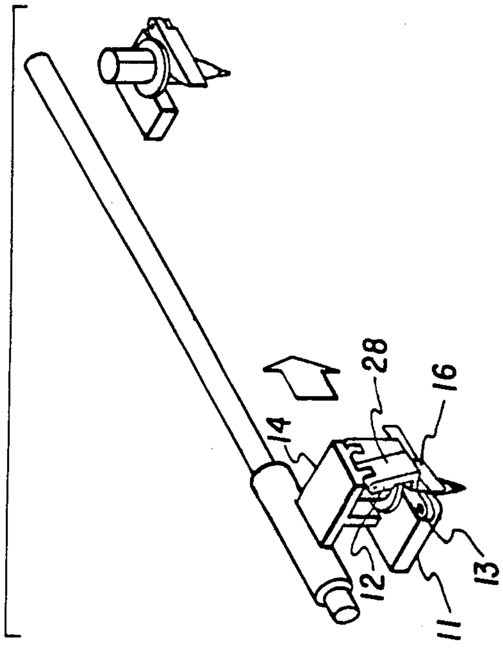

In the reverse procedure shown in FIGS. 12 through 14, pen 12 is re-inserted into pen stable 11. As pen holder 14, holding pen 12, approaches pen stable 11, clamp arm 13 pushes clamp arm 16 aside, causing extension arm 28 to rotate about its hinge. Clamp arm 13 then clasps pen 12 via its barb-shaped end, thereby holding pen 12 in firm contact with pen stable 11. Just as the snatch and re-insertion procedure was performed from one side with pen stable 11, the symmetry of pen holder 14 permits operation from the other side as well. Therefore, by providing a second pen stable 31, opposite pen stable 11, a two-pen system can be developed as illustrated in FIGS. 10 through 14, the pen holder alternately using one pen and then the other.

Another important element of the symmetrical nature of pen holder 14 is that its symmetry is maintained while holding a pen, i.e., the pen tip lies in the plane of symmetry of the pen holder. Thus, no matter from which side a pen is snatched, it will still have the same pen tip location. This is a significant advantage over a system where the pen tip location is not independent of the stable from which it is snatched, since in these latter devices software coordinate system translations are required each time a pen is changed.

Several other advantages of this bi-directional pen changing system should also be relatively apparent. For example, even though only a single axis for pen carriage motion is available as in the embodiment shown in FIGS. 10 through 14, the bi-directional nature of pen holder 14 makes it possible to have two-color plotting, or to use two different kinds of pens, without having to change pen holders. Further, by providing banks of pen stables on each end of the carriage, either with a system of turrets or by means of movable pen stable racks, multi-color/multi-pen plotting becomes readily available. In addition, the single stroke, single action pen change is exceedingly simple. No prime mover other than a pen axis motor is required to change pens, and pen carriage motion is the same when inserting a pen in a stable as it is when snatching it from a stable.

We claim:

1. A pen holding and changing device for use in a plotter comprising:

pen stable means mounted to said plotter for holding pens at two fixed locations, one of said two fixed locations at each of two opposite sides of said plotter, when said pens are not in use for plotting;

pen holder/changer means mounted to said plotter for holding one of said pens during plotting, said pen holder/changer means having a first direction of motion defined by the line between said two fixed locations, said pen holder/changer means also for snatching said pen from said pen stable means from either of said fixed locations by moving only along said first direction of motion.

2. A device as in claim 1 wherein said pen holder/-changer means is also for re-inserting said pen into said pen stable means at either of said fixed locations by moving only along said first direction of motion.

3. A device as in claim 2 wherein said pen holder/-changer means further comprises a movable body, movable in said first direction of motion, having first and second clamp arms attached thereto.

4. A device as in claim 3 wherein said pen holder/-changer means holds said pen in the same location relative to said first and second clamp arms, independent of said fixed location from which said pen was snatched.

5. A device as in claim 4 wherein said pen stable means further comprises first and second separate units, one at each fixed location, each unit comprising a fixed body and a single clamp arm with a barb-shaped end for holding said pen against said fixed body.

6. A device as in claim 5 wherein each of said clamp arms of said pen holder/changer further comprise barb-shaped ends.

7. A device as in claim 6 wherein said movable body of said pen holder/changer means further comprises a concave portion for providing a stable position for said pen.

8. A device as in claim 7 wherein when said pen holder/changer means is moved into close proximity to one of said separate units, said clamp arms of said pen holder/changer means and said clamp arms of said separate unit coact to exchange said pen between said pen holder/changer means and said separate unit.

* * * * *